(12) United States Patent
Ren et al.

(10) Patent No.: US 11,928,830 B2
(45) Date of Patent: Mar. 12, 2024

(54) SYSTEMS AND METHODS FOR GENERATING THREE-DIMENSIONAL RECONSTRUCTIONS OF ENVIRONMENTS

(71) Applicant: Honeywell International Inc., Charlotte, NC (US)

(72) Inventors: Zhiguo Ren, Shanghai (CN); Alberto Speranzon, Plymouth, MN (US); Carl Dins, Phoenix, AZ (US); Juan Hu, Shanghai (CN); Zhiyong Dai, Shanghai (CN); Vijay Venkataraman, Plymouth, MN (US)

(73) Assignee: Honeywell International Inc., Charlotte, NC (US)

( * ) Notice: Subject to any disclaimer, the term of this patent is extended or adjusted under 35 U.S.C. 154(b) by 159 days.

(21) Appl. No.: 17/645,591

(22) Filed: Dec. 22, 2021

(65) Prior Publication Data
US 2023/0196597 A1    Jun. 22, 2023

(51) Int. Cl.
*G06T 7/521*    (2017.01)
*G06T 7/593*    (2017.01)
*G06T 17/10*    (2006.01)

(52) U.S. Cl.
CPC .............. *G06T 7/521* (2017.01); *G06T 7/593* (2017.01); *G06T 17/10* (2013.01);
(Continued)

(58) Field of Classification Search
CPC ........... G06T 17/10; G06T 2207/10016; G06T 2207/10028; G06T 2207/10032;
(Continued)

(56) References Cited

U.S. PATENT DOCUMENTS 6,664,529 B2  12/2003  Pack et al.
8,208,716 B2   6/2012  Choi et al.
(Continued)

FOREIGN PATENT DOCUMENTS

CN         110163968 B     8/2020
DE   10 2008 002 725 B4   11/2013
(Continued)

OTHER PUBLICATIONS

Zhuang Zhang et al., "Scale Estimation and Correction of the Monocular Simultaneous Localization and Mapping (SLAM) Based on Fusion of 1D Laser Range Finder and Vision Data", Jun. 15, 2018, Sensors, vol. 18 (17 pages).
(Continued)

*Primary Examiner* — Ming Wu
(74) *Attorney, Agent, or Firm* — Alston & Bird LLP (57) ABSTRACT

Disclosed are methods and systems for generating three-dimensional reconstructions of environments. A system, for example, may include a housing having an image sensor directed in a first direction and a distance sensor directed in a second direction and a control unit including a processor and a memory storing instructions. The processor may be configured to execute the instructions to: generate a first 3D model of an environment; generate a plurality of revolved 3D models by revolving the first 3D model relative to the image sensor to a plurality of positions within a predetermined angular range; match a set of distance values to one of the revolved 3D models; determine an angular position of the second direction relative to the first direction; and generate a 3D reconstruction of the environment.

20 Claims, 9 Drawing Sheets

(52) U.S. Cl.
CPC ............... *G06T 2207/10028* (2013.01); *G06T 2207/20081* (2013.01); *G06T 2207/20084* (2013.01)

(58) Field of Classification Search
CPC . G06T 2207/20056; G06T 2207/20081; G06T 2207/20084; G06T 2207/30252; G06T 7/30; G06T 7/521; G06T 7/579; G06T 7/593; G06T 7/75

See application file for complete search history.

(56) References Cited

U.S. PATENT DOCUMENTS

| | | | |
|---|---|---|---|
| 8,773,514 | B2 | 7/2014 | Gharib et al. |
| 8,996,172 | B2 | 3/2015 | Shah et al. |
| 9,311,757 | B2 | 4/2016 | Osamura et al. |
| 10,726,612 | B2 | 7/2020 | Han et al. |
| 2009/0010507 | A1 | 1/2009 | Geng |
| 2012/0056986 | A1 | 3/2012 | Popovic |
| 2016/0249039 | A1 | 8/2016 | Tran et al. |
| 2019/0151043 | A1* | 5/2019 | Wada ..................... G16H 30/40 |
| 2019/0394363 | A1* | 12/2019 | Sun ........................ H04N 5/144 |
| 2020/0101890 | A1 | 4/2020 | Solar et al. |
| 2020/0137417 | A1 | 4/2020 | Izumi |
| 2020/0273190 | A1 | 8/2020 | Ye et al. |
| 2020/0358966 | A1* | 11/2020 | Lee ....................... H04N 13/271 |
| 2021/0056685 | A1* | 2/2021 | Zhang ..................... G06T 7/194 |

FOREIGN PATENT DOCUMENTS

| | | |
|---|---|---|
| JP | 2018-515825 A | 6/2018 |
| WO | 2014/033731 A2 | 3/2014 |
| WO | 2021/160257 A1 | 8/2021 |

OTHER PUBLICATIONS

Extended European Search Report dated Jul. 12, 2022 in European Application No. 22150850.0 (10 pages).

Henrik Andreasson et al., "Vision Aided 3D Laser Scanner Based Registration", ECMR 2007, Jan. 1, 2007, pp. 1-6.

Chen Hui et al., "Outdoor Scene 3D Reconstruction from Multiple Point Cloud", Tenth International Conference on Graphics and Image Processing (ICGIP 2018), Proc. of SPIE vol. 11069, pp. 1106912-1-1106912-9.

* cited by examiner

SYSTEMS AND METHODS FOR GENERATING THREE-DIMENSIONAL RECONSTRUCTIONS OF ENVIRONMENTS

TECHNICAL FIELD

Various embodiments of the present disclosure relate generally to systems and methods generating three-dimensional reconstructions of environments and, more particularly, to systems and methods for generating three-dimensional reconstructions of environments by fusion of sets of images and sets of distance values.

BACKGROUND

As adoption of autonomous vehicles and machines continues to increase, the utility of digitally reconstructing the three-dimensional environments through which the vehicles and machines navigate will likewise increase. For example, autonomous mobile robots, self-driving cars, unmanned aerial vehicles (UAVs), and urban air mobility vehicles (UAMs) may each utilize three-dimensional reconstructions of environments. Three-dimensional reconstructions may enhance the ability of the vehicles or machines to navigate the environment and avoid collisions with structures, people, animals, and/or other vehicles and machines, for example. Generation of accurate three-dimensional reconstructions, however, may require complex and expensive hardware and/or complex calibration procedures.

The present disclosure is directed to overcoming one or more of these above-referenced challenges.

SUMMARY OF THE DISCLOSURE

According to certain aspects of the disclosure, systems and methods for generating three-dimensional reconstructions of environments are described.

In one example, a system may include: a housing including an image sensor directed in a first direction and a distance sensor directed in a second direction, wherein during movement of the housing through an environment the image sensor may be configured to generate an image sequence and the distance sensor may be configured to generate a set of distance values, wherein the second direction is within a predetermined angular range of the first direction; and a control unit including a processor and a memory storing instructions. The processor may be configured to execute the instructions to: generate, based on the image sequence, a first 3D model of the environment; generate a first set of revolved 3D models by revolving the first 3D model relative to the image sensor to a first plurality of positions within the predetermined angular range; match the set of distance values to at least one of the first set of revolved 3D models; determine, based on the matched at least one of the first set of revolved 3D models, a first angular position of the second direction relative to the first direction; and generate, based on the first 3D model, the set of distance values, and the first angular position, a 3D reconstruction of the environment, the 3D reconstruction including information indicative of a scale of the environment.

In some embodiments, the image sensor may be incorporated within a monocular camera and the distance sensor may be a single beam laser distancer including a laser emitter and a laser receiver.

In some embodiments, the memory may further store a machine learning model trained to learn associations between at least (i) a set of image sequences and (ii) a set of 3D models, each of the image sequences corresponding to a 3D model; and the processor may be configured to generate the first 3D model of the environment using the machine learning model.

In some embodiments, the machine learning model may be a convolutional neural network.

In some embodiments, the revolved 3D models may be generated by incrementally revolving the 3D model relative to the image sensor to a predetermined number of positions extending substantially through the predetermined angular range.

In some embodiments, the revolved 3D models may be generated by: incrementally revolving the first 3D model relative to the image sensor about a first axis to a first predetermined number of positions; and incrementally revolving the first 3D model relative to the image sensor about a second axis to a second predetermined number of positions; wherein the first axis may be orthogonal to the second axis.

In some embodiments, the first 3D model and/or the revolved 3D models may be 3D point clouds.

In some embodiments, the processor may be further configured to execute the instructions to determine the angular position by: generating a second set of revolved 3D models by revolving the matched at least one of the first set of revolved 3D models relative to the image sensor to a second plurality of positions, the second plurality of positions existing in a fine angular range within the predetermined angular range; and matching the set of distance values to at least one of the second set of revolved 3D models.

In some embodiments, the processor may be further configured to execute the instructions generate the 3D reconstruction in part by fusing the first 3D model and the set of distance values.

In some embodiments, the processor may be further configured to execute the instructions to compensate for the angular position during generation of the 3D reconstruction.

In another example, a method may include: moving a housing through an environment. The housing may include an image sensor directed in a first direction and a distance sensor directed in a second direction, and the second direction may be within a predetermined angular range of the first direction. The method may further include: during movement of the housing through the environment, generating an image sequence using the image sensor and generating a set of distance values using the distance sensor; generating, using a processor and based on the image sequence, a first 3D model of the environment; generating, using the processor based on the first 3D model and the predetermined angular range, a plurality of revolved 3D models by revolving the first 3D model relative to the image sensor to a plurality of positions within the predetermined angular range; matching, using the processor, the set of distance values to at least one of the revolved 3D models; determining, using the processor and based on the matched at least one of the revolved 3D models, an angular position of the second direction relative to the first direction; and generating, using the processor and based on the first 3D model, the set of distance values, and the angular position, a 3D reconstruction of the environment, the 3D reconstruction including information indicative of a scale of the environment.

In some embodiments, the image sensor may be incorporated within a monocular camera and the distance sensor may be a single beam laser distancer including a laser emitter and a laser receiver.

In some embodiments, the processor may be operatively connected to a memory storing instructions and a machine learning model trained to learn associations between at least (i) a set of image sequences and (ii) a set of 3D models, each of the image sequences corresponding to a 3D model; and generating the first 3D model of the environment may be performed by the processor using the machine learning model.

In some embodiments, generating the revolved 3D models may further include incrementally revolving the 3D model relative to the image sensor to a predetermined number of positions extending substantially through the predetermined angular range.

In some embodiments, generating the revolved 3D models may further include: incrementally revolving the first 3D model relative to the image sensor about a first axis to a first predetermined number of positions; and incrementally revolving the first 3D model relative to the image sensor about a second axis to a second predetermined number of positions; wherein the first axis may be orthogonal to the second axis.

In some embodiments, the first 3D model and the revolved 3D models may be 3D point clouds.

In some embodiments, determining the angular position may include: generating, using the processor, a second set of revolved 3D models by revolving the matched at least one of the first set of revolved 3D models relative to the image sensor to a second plurality of positions, the second plurality of positions existing in a fine angular range within the predetermined angular range; and matching, using the processor, the set of distance values to at least one of the second set of revolved 3D models.

In some embodiments, generating the 3D reconstruction may include: fusing the first 3D model and the set of distance values.

In some embodiments, generating the 3D reconstruction may further include compensating for the angular position during generation of the 3D reconstruction.

In a further example, a non-transitory computer readable medium storing instructions that, when executed by a processor, may perform a method including: during movement of a housing through a environment, generating an image sequence using an image sensor, wherein the image sensor may be mounted relative to the housing and directed in a first direction; during movement of the housing through the environment, generating a set of distance values using a distance sensor, wherein the distance sensor may be mounted relative to the housing and directed in a second direction, wherein the second direction may be within a predetermined angular range of the first direction; generating, based on the image sequence, a first 3D model of the environment; generating, based on the first 3D model and the predetermined angular range, a plurality of revolved 3D models by revolving the first 3D model relative to the image sensor to a plurality of positions within the predetermined angular range; matching the set of distance values to at least one of the revolved 3D models; determining, based on the matched at least one of the revolved 3D models, an angular position of the second direction relative to the first direction; and generating, based on the first 3D model, the set of distance values, and the angular position, a 3D reconstruction of the environment, the 3D reconstruction including information indicative of a scale of the environment.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to systems and methods for generating three-dimensional reconstructions of environments and, more particularly, to systems and methods for generating three-dimensional reconstruction of environments by fusion of sets of images and sets of distance values.

Reconstructing three-dimensional environments may be an important aspect of operation of autonomous machines and vehicles. In contrast with a machine or vehicle having a human operator, an autonomous machine or vehicle must navigate environments on its own, avoiding collisions with objects in the environments. Accordingly, such machines and vehicles may utilize three-dimensional reconstructions of environments as a sort of machine "vision" for detecting such objects.

Generation of accurate three-dimensional reconstructions with accurate information about the scale of objects within the environment, however, may require complex and expensive hardware and/or complex calibration procedures. A monocular camera on its own may be used to model an environment, but such a model may lack information about scale. LiDAR may allow for reconstruction of environments with scale, but may require expensive and complex hardware. Systems using multiple cameras for stereovision, or the like, may require complex calibration procedures such as chessboard calibrations.

Systems including a monocular camera and a laser distancer may offer an effective platform for generating three-dimensional reconstructions of environments. Such components may be cost-effective, compact and lightweight, and highly accurate, offering feasibility in applications such as autonomous mobile robots, self-driving cars, UAVs, and UAMs, among others. Fusion of images generated by the camera with distance values generated by the distancer, however, may require precise calibration for generation of accurate reconstructions.

Accordingly, a need exists to address the foregoing challenges. In particular, a need exists for improved systems and methods for generating three-dimensional reconstructions of environments. Embodiments of this disclosure offer technical solutions to address the foregoing needs, as well as other needs.

Figure 1:
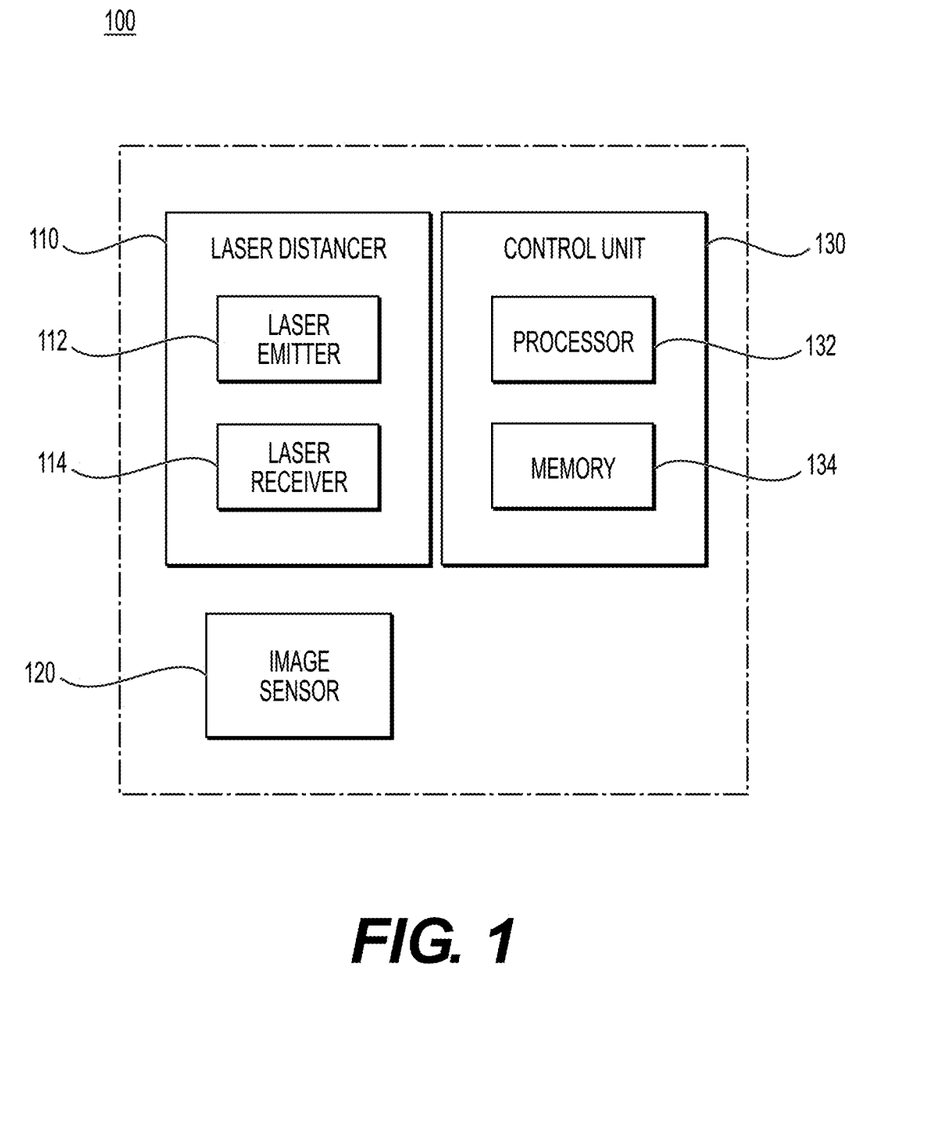
FIG. 1 depicts a functional block diagram of an exemplary system for generating a three-dimensional reconstruction of an environment, according to one or more embodiments.

FIG. 1 depicts a functional block diagram of an exemplary system for generating three-dimensional reconstructions of environments that may be used with techniques described herein. System 100 may include a laser distancer 110, an image sensor 120, and a control unit 130. As will be described herein, components of system 100 may communicate and/or cooperate to generate three-dimensional reconstructions of environments. The foregoing elements of system 100 may be coupled together by any suitable interconnection architecture that accommodates data communication and/or the delivery of operating power to components of system 100. It should be understood that FIG. 1 is a simplified representation of system 100 that will be used for purposes of explanation and ease of description, and that FIG. 1 is not intended to limit the scope of the subject matter in any way. In practice, system 100 may include other devices and components for providing additional functions and features, as will be appreciated in the art. Though not shown in FIG. 1, system 100 may further include a housing or multiple housings in which components of system 100 are installed.

Laser distancer 110 may be installed within a housing of system 100 and may include a laser emitter 112 and a laser receiver 114. Laser distancer 110 may be configured to detect a distance of an object from laser distancer 110. For example, laser distancer 110 may emit a beam of light from the laser emitter 112 toward an object. The laser receiver 114 may then detect a reflection of the light beam reflected off of the object toward the laser receiver 114. Using the total time elapsed between emission of the beam of light from the laser emitter and reception of the reflected light beam, laser distancer 110 may calculate a distance between the object and laser distancer 110. In some embodiments, such calculations may be made by control unit 130. Laser distancer 110 may be configured to emit and detect light beams continuously, and/or to calculate distances between objects and laser distancer 110 continuously as laser distancer 110 and/or system 100 is translated through an environment. In some embodiments, laser distancer 110 may be a single beam laser distancer. In some embodiments, laser distancer 110 may be a LiDAR device. In some embodiments, system 100 may include a different device in lieu or in addition to laser distancer 110 configured to generate distance measurements by any suitable technique.

Image sensor 120 may likewise be installed within a housing of system 100 and may be incorporated as part of a camera. In some embodiments, the camera may be a monocular camera having a single aperture with one or more lenses. Image sensor 120 may be configured to generate sequences of images of environments. In some embodiments, image sensor 120 may be configured to continuously generate images as image sensor 120 and/or system 100 is translated through an environment. As a result, image sensor 120 may generate a sequence of images while image sensor 120 is in different positions. For example, system 100 may be incorporated as part of unmanned aerial vehicle (UAV) configured to fly through environments and/or over land and water. Image sensor 120 may generate images continuously as the UAV flies, thereby creating a sequence of images corresponding to the path of travel of the UAV.

Control unit 130 may include a processor 132 and a memory 134. Processor 132 may be implemented or realized with one or more general purpose processors, graphical processing units (GPUs), content addressable memory, digital signal processors, application specific integrated circuits, field programmable gate arrays, any suitable programmable logic devices, discrete gate or transistor logic, discrete hardware components, or any combination designed to perform the functions described here. A processor device may be realized as a microprocessor, a controller, a microcontroller, or a state machine. Moreover, a processor device may be implemented as a combination of computing devices (e.g., a combination of a digital signal processor and a microprocessor, a plurality of microprocessors, one or more microprocessors in conjunction with a digital signal processor core, or any other such configuration). As described in further detail herein, processor 132 may generate three-dimensional models and three-dimensional reconstructions of environments.

Memory 134 may be a RAM memory, flash memory, EPROM memory, EEPROM memory, registers, a hard disk, a removable disk, a CD-ROM, any other form of storage medium known in the art, or any combination of the foregoing. Memory 134 may be coupled to processor 132 such that processor 132 can read information from, and write information to, memory 134. In the alternative, memory 134 may be integral to processor 132. As an example, processor 132 and memory 134 may reside in an ASIC. In practice, a functional or logical module of the system 100 may be realized using program code that is maintained in memory 134. Moreover, memory 134 may be used to store data utilized to support the generation of three-dimensional reconstructions of environments, according to the following description.

Figure 2:
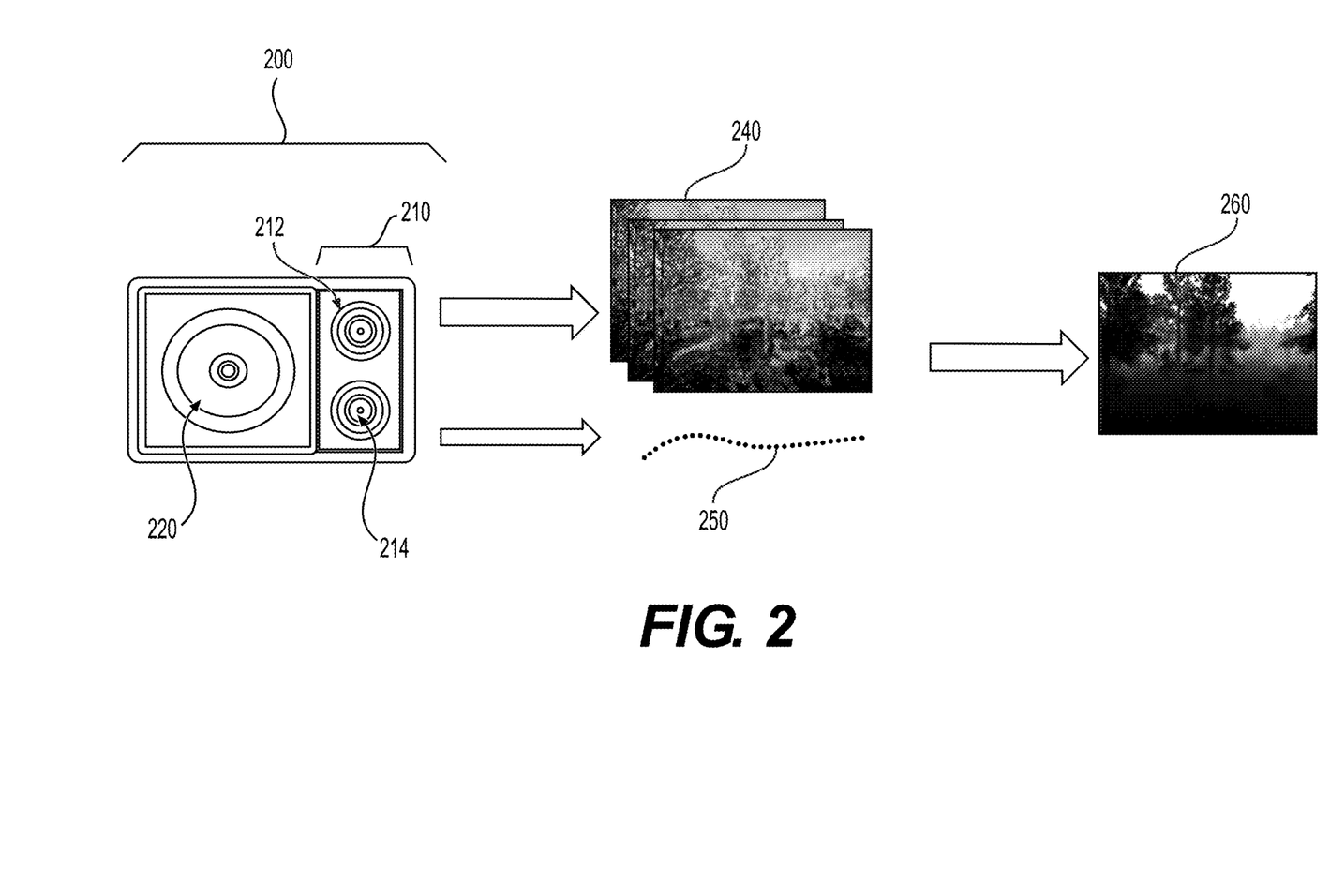
FIG. 2 depicts a flow diagram of a method of generating a three-dimensional reconstruction of an environment, according to one or more embodiments.

FIG. 2 depicts a simplified flow diagram of a method of generating a three-dimensional reconstruction of an environment according to some embodiments. A system 200 for generating a three-dimensional reconstruction of an environment may include an image sensor 220 and a laser distancer 210. Laser distancer 210 may further include a laser emitter 212 and a laser detector 214. As described herein previously with reference to FIG. 1, image sensor 220 may be configured to generate a sequence of images of an environment as system 200 is translated through the environment. Similarly, laser emitter 212 may be configured to emit light beams as system 200 is translated through the environment. The light beams may reflect off of various objects in the environment and may be subsequently detected by laser detector 214. Using the time between emission of a light beam and subsequent detection of the light beam, the laser distancer and/or control unit of system 200 may calculate a distance of an individual object from system 200 at a given time.

As system 200 is translated through an environment, image sensor 220 may generate an image sequence 240. Image sequence 240 may include a plurality of images of the environment, each taken from a slightly different position as image sensor 220 is translated through the environment. Additionally, laser emitter 212, laser detector 214, and/or the control unit of system 200 may collectively generate a set of distance values 250. The set of distance values 250 may include a plurality of distance values, each corresponding to a pulse of light emitted by laser emitter 212.

Simplifying for illustration purposes only, system 200 may be configured to fuse image sequence 240 and distance values 250 to generate a three-dimensional reconstruction 260 of the environment through which system 200 may be translated. Three-dimensional reconstruction 260 may include representations of objects within the environment as well as scale information for the objects. Such scale information may include absolute sizes and relative positions of the objects, for example.

Figure 3:
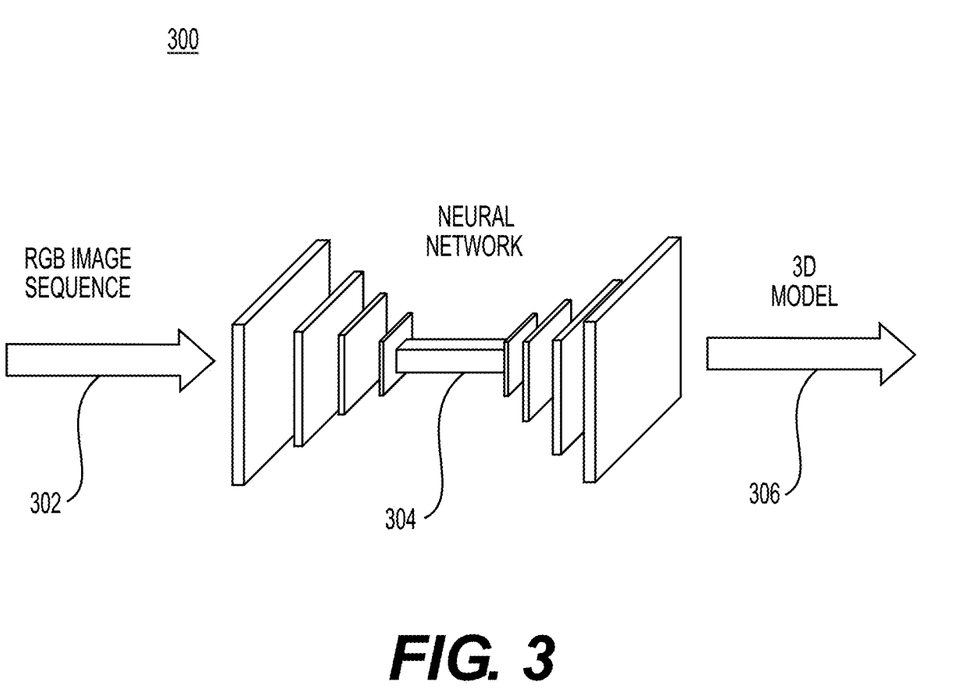
FIG. 3 depicts a flow diagram of a method of generating a three-dimensional reconstruction of an environment, according to one or more embodiments.

To generate three-dimensional reconstruction 260, system 200 may generate a three-dimensional model without scale from images 240. FIG. 3 depicts an exemplary method 300 of generating a three-dimensional model 306 according to certain embodiments. For example, an image sequence 302 may first be generated by an image sensor such as image sensor 220 described herein previously. The image sequence 302 may then be transmitted to a control unit. In some embodiments, the control unit may include a machine learning model 304. In some embodiments, machine learning model 304 may be a neural network such as a convolutional neural network.

In some embodiments, machine learning model 304 may be trained to learn associations between image sequences and three-dimensional models. Machine learning model 304 may be trained by any suitable method, such as by supervised training, semi-supervised training, and/or unsupervised training. In some embodiments, machine learning model 304 may be trained using training sets. For example, machine learning model 304 may be provided a training set of image sequences and a training set of three-dimensional models. Machine learning model 304 may be trained to learn associations between image sequences and one or more of the three-dimensional models.

Using machine learning model 304, the control unit may generate a three-dimensional model 306 without scale. The control unit may generate the three-dimensional model without any distance measurements received or derived from the laser distancer. The control unit may use any suitable technique, such as triangulation or the like, for processing the sequence of images to generate the three-dimensional model.

Figure 4:
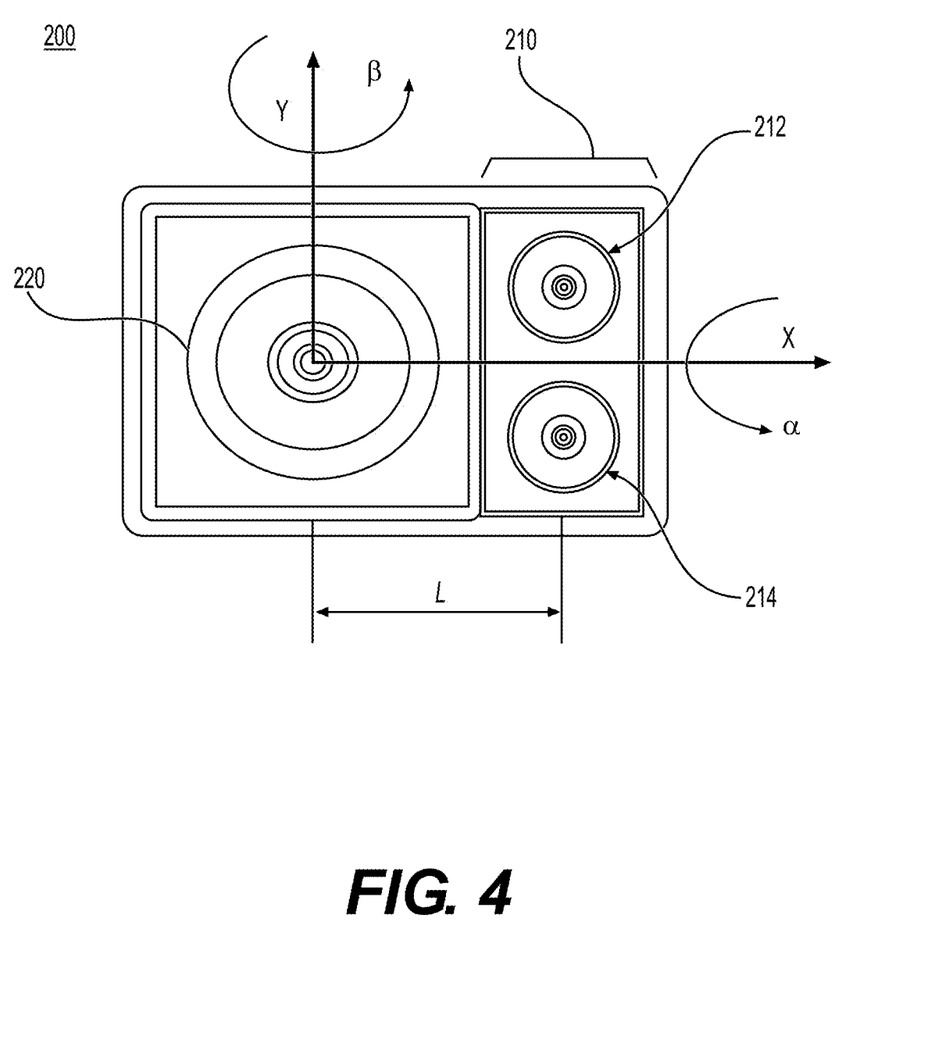
FIG. 4 depicts an exemplary system for generating a three-dimensional reconstruction of an environment, according to one or more embodiments.

Before a three-dimensional model may be fused with distance values generated by a laser distancer to generate a three-dimensional reconstruction with scale information, imperfections in the system may be accounted for. FIG. 4 depicts exemplary imperfections of a system for generating three-dimensional reconstructions of environments. Specifically, FIG. 4 depicts exemplary variances in the positioning of image sensor 220 relative to laser distancer 210 (including laser emitter 212 and laser detector 214, collectively) in system 200. Such variances in the positioning of image sensor 220 relative to laser distancer 210 may be due to imperfections irregularities in manufacturing and/or assembly processes. For example, such variances may reflect known manufacturing tolerances.

Referring to FIG. 4, system 200 may include image sensor 220 and laser distancer 210 as described herein previously. Image sensor 220 may be installed within a housing of system 200 and may be configured to be directed in a first direction (i.e. out of the page in FIG. 4). Laser emitter 212 and laser detector 214 may likewise be installed in the housing and may be configured to be directed in a second direction (also out of the page in FIG. 4).

Ideally, the first direction and the second direction may be the same. In other words, ideally all of image sensor 220, laser emitter 212 and laser detector 214 may be oriented in the same direction. Under ordinary manufacturing or assembly conditions, however, the first direction and the second direction may not be exactly the same. Rather, laser distancer 210 may be angularly offset from image sensor 220. The angular offset may be described with reference to a vertical axis Y and a horizontal axis X, each axis intersecting the center of image sensor 220. The angular offset may include an angular component $\alpha$ about the X axis and/or an angular component $\beta$ about a Y axis. Absent calibration and compensation for such an angular offset, the angular offset may impact the ability of system 200 to accurately generate a three-dimensional reconstruction of an environment. Specifically, the angular offset may inhibit system 200 from accurately fusing an image sequence generated by image sensor 220 with a set of distance values generated by laser distancer 210.

Figure 5A:
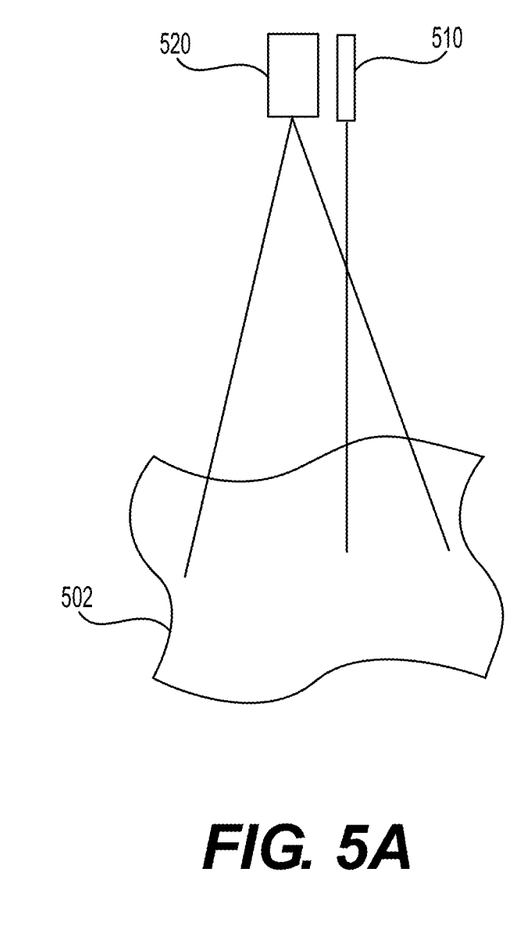
FIG. 5A depicts an exemplary arrangement of a system for generating a three-dimensional reconstruction of an environment, according to one or more embodiments.

FIGS. 5A, 5B, 6A, and 6B illustrate potential variances in installations of components of a system and the impacts those variances may have. Beginning with FIG. 5A, an image sensor 520 and a laser distancer 510 are shown schematically as installed in a first system. In some embodiments, image sensor 520 and laser distancer 510 may be installed within a common housing. Image sensor 520 may be directed in a first direction whereas laser distancer 510 may be directed in a second direction. As shown in FIG. 5A, the first direction and the second direction may be the same or substantially the same such that each of image sensor 520 and laser distancer 510 are aimed directly toward target environment 502.

Figure 5B:
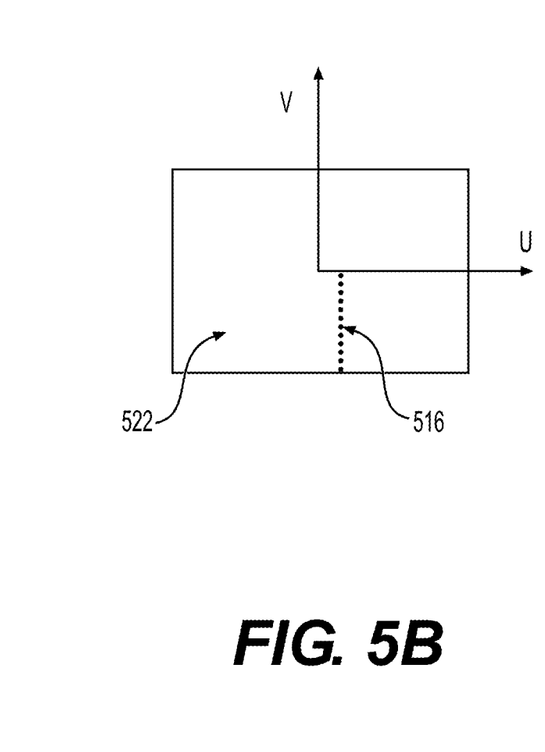
FIG. 5B depicts an exemplary depth estimation and distance value sequence, according to one or more embodiments.

During operation of the system for generation of a three-dimensional reconstruction of target environment 502, image sensor 520 and laser distancer 510 may collectively be translated relative to target environment 502 to generate an image sequence and a set of distance values. As shown in FIG. 5B, the system may generate a three-dimensional model 522 (without scale) of target environment 502 using the image sequence. The system may further generate a set of distance values 516 corresponding to target environment 502. When image sensor 520 and laser distancer 510 are installed as shown in FIG. 5A, i.e. such that effectively no angular offset exists between them, distance values 516 may align directly with three-dimensional model 522 and/or the path of movement of image sensor 520 and laser distancer 510. As a result, fusing distance values 516 with three-dimensional model 522 to generate a three-dimensional reconstruction may involve relatively simple operations and/or calculations and may result in an accurate three-dimensional reconstruction.

Figure 6A:
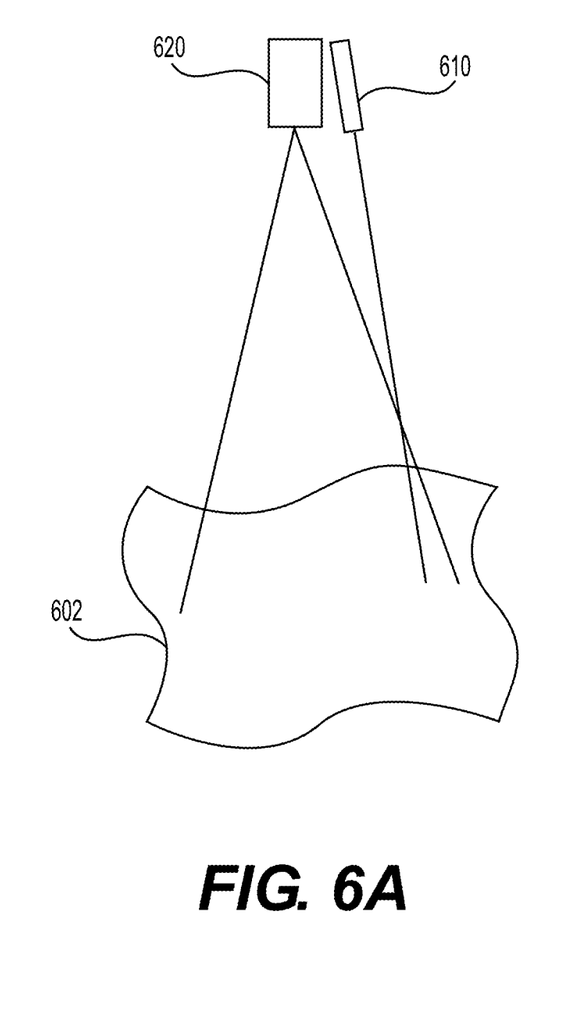
FIG. 6A depicts an exemplary arrangement of a system for generating a three-dimensional reconstruction of an environment, according to one or more embodiments.

By contrast, FIG. 6A schematically depicts an image sensor 620 and a laser distancer 610 installed in a second system. Image sensor 620 may be directed in a first direction whereas laser distancer 610 may be directed in a second direction. As shown in FIG. 6A, the first direction and the second direction may not be the same such that laser distancer 610 is angularly offset with respect to image sensor 620. In other words, image sensor 620 and laser distancer 610 may be offset relatively to each other by some non-zero angle. Accordingly, while each of image sensor 620 and laser distancer 610 are aimed generally toward target environment 602, they are not perfectly aligned.

Figure 6B:
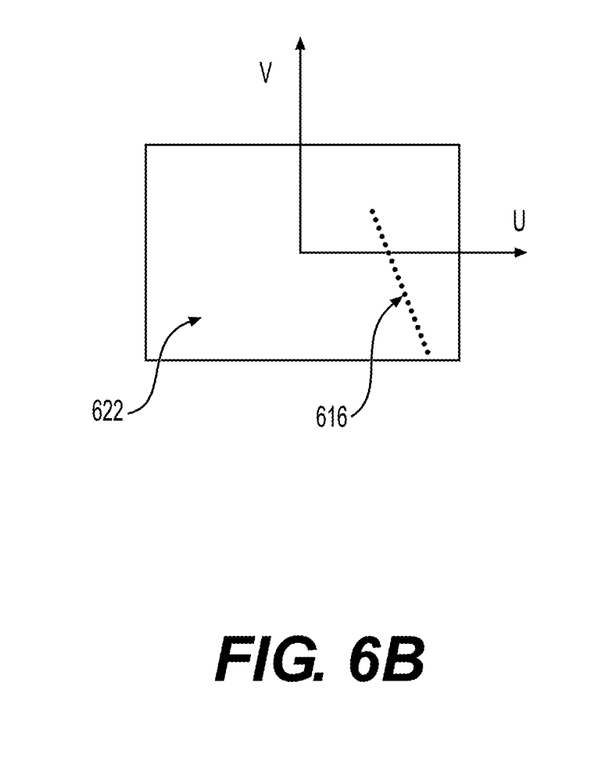
FIG. 6B depicts an exemplary depth estimation and distance value sequence, according to one or more embodiments.

During operation of the system for generation of a three-dimensional reconstruction of target environment 602, image sensor 620 and laser distancer 610 may collectively be translated relative to target environment 602 to generate an image sequence and a set of distance values. As shown in FIG. 6B, the system may generate a three-dimensional model 622 of target environment 602 using the image sequence. The system may further generate a set of distance values 616. When image sensor 620 and laser distancer 610 are installed as shown in 6A, i.e. such that a positive offset angle exists between them, distance value 616 may not align directly with three-dimensional model 622 and/or the path of movement of image sensor 620 and laser distancer 610. Distance values 616, for example, may appear as a sequence of values that are angled relative to three-dimensional model 622. As a result, distance values 616 may not be fused with three-dimensional model 622 to generate an accurate three-dimensional reconstruction using simple operations and/or calculations.

To compensate for variances in the position of an image sensor relative to a laser distancer, systems according to the present disclosure may perform a calibration procedure. In some embodiments, the calibration procedure may be performed automatically by the system such that no user intervention is required.

Figure 7:
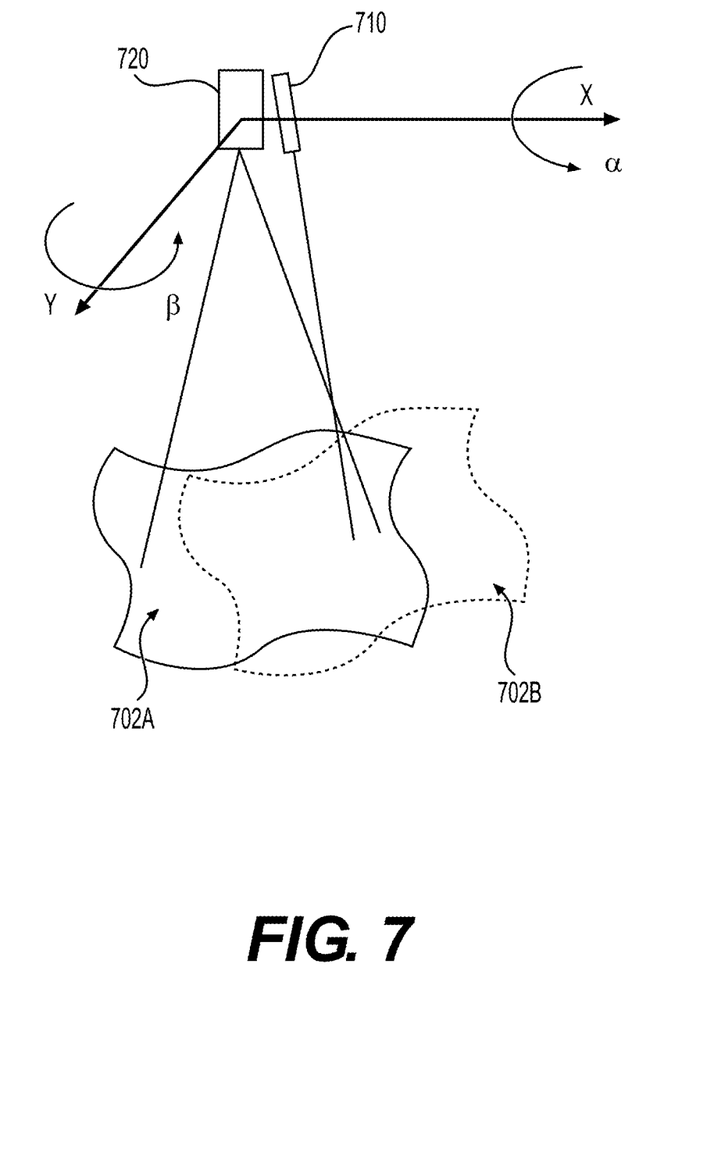
FIG. 7 depicts an exemplary technique for generating a revolved three-dimensional model.

FIG. 7 illustrates an exemplary technique for calibrating a system, with the system shown schematically. The system may include, for example, an image sensor 720 and a laser distancer 710. Image sensor 720 and laser distancer 710 may each be installed in a common housing. Image sensor 720 and laser distancer 710 may further be installed such that a non-zero offset angle exists between them. Image sensor 720 and laser distancer 710 may be directed generally toward a target environment (not depicted in FIG. 7), albeit at slightly different angles.

During operation of the system to generate a three-dimensional reconstruction of the target environment, laser distancer 710 and image sensor 720 may collectively be translated relative to the target environment. Laser distancer 710 and image sensor 720 may generate a set of distance values and a sequence of images, respectively. Based on the sequence of images, the system may generate a three-dimensional model 702A (without scale) of the target environment. In some embodiments, three-dimensional model 702A may be a three-dimensional point cloud. In some embodiments, three-dimensional model 702A may be any other suitable type of model of the target environment. It should be understood that in FIG. 7 three-dimensional model 702A is shown as existing in the same space as laser distancer 710 and image sensor 720 for illustrative purposes only. In practice, three-dimensional model 702A may exist digitally and/or virtually as a set of data.

To generate a three-dimensional reconstruction of the target environment with scale information, the system may fuse three-dimensional model 702A with the set of distance values generated by laser distancer 710. Due to the angle of offset between image sensor 720 and laser distancer 710, however, calibration may be required to compensate for the angle of offset and allow for fusion of three-dimensional model 702A with the set of distance values.

For example, as part of the calibration process, the system may revolve three-dimensional model 702A about image sensor 720 to generate revolved model 702B as shown in FIG. 7. Like three-dimensional model 702A, revolved model 702B may lack scale. Though not shown in FIG. 7, the system may further revolve three-dimensional model 702A relative to image sensor 720 through a plurality of other positions to generate a plurality of other revolved models. In some embodiments, the system may incrementally revolve three-dimensional model 702A through combinations of various angles $\alpha$ and $\beta$.

In some embodiments, a revolutionary transformation of a point in a three-dimensional model about the X axis may be represented by:

$$\begin{bmatrix} x' \\ y' \\ z' \\ 1 \end{bmatrix} = \begin{bmatrix} 1 & 0 & 0 & 0 \\ 0 & \cos\theta & -\sin\theta & 0 \\ 0 & \sin\theta & \cos\theta & 0 \\ 0 & 0 & 0 & 1 \end{bmatrix} * \begin{bmatrix} x \\ y \\ z \\ 1 \end{bmatrix}$$

In some embodiments, a revolutionary transformation of point in a three-dimensional model about the Y axis may be represented by:

$$\begin{bmatrix} x' \\ y' \\ z' \\ 1 \end{bmatrix} = \begin{bmatrix} \cos\theta & 0 & \sin\theta & 0 \\ 0 & 1 & 0 & 0 \\ -\sin\theta & 0 & \cos\theta & 0 \\ 0 & 0 & 0 & 1 \end{bmatrix} * \begin{bmatrix} x \\ y \\ z \\ 1 \end{bmatrix}$$

The range of angles $\alpha$ and $\beta$ through which the system may revolve three-dimensional model 702A may be based on known variances in the positioning of laser distancer 710 relative to image sensor 720. Such variances may be derived or understood from comparable systems or devices, from manufacturing tolerances, from assembly practices, or the like.

For each revolved model, including revolved model 702B, the system may compare the set of distance values generated by laser distancer 710 to the revolved model. The system may then identify a revolved model that best matches the set of distance values. The system may identify the best match using an optimization algorithm, for example, or any other known suitable matching technique.

In some embodiments in which the three-dimensional model and the revolved models are each three-dimensional point clouds, the system may identify a revolved model that best matches the set of distance values as follows. Each of the three-dimensional model and the revolved models may include a set of points having X, Y, and Z coordinates. A model having M number of points may be represented by a matrix having M columns and three rows, where each row represents one of the X, Y, or Z coordinates. Each column may be extracted from the matrix and a Fourier transformation may be used to determine the main frequency ($F_1$) of the matrix, where $F_1$ may be indicative of an estimated distance from the origin, or image sensor 720. Similarly, a Fourier transformation may be used to determine the main frequency ($F_0$) of the set of distance values. Using $F_1$ and $F_0$, a scale coefficient K may be calculated where $K=F_1/F_0$. Using the scale coefficient K, the set of distance values may be resampled. Using the resampled distance values and each matrix corresponding to each revolved model, the matrices may be filtered to generate filtered matrices. The system may then determine the maximum value occurring across all of the matrices and may further identify its column and row, which may be represented by (A, B), of the individual matrix in which it exists. Using the values (A, B), the system may calculate the angular offset about the X and Y axes.

In some embodiments, based on the position of the revolved model that best matches the set of distance values, the system may determine the angular offset between image sensor 720 and laser distancer laser distancer 710. For example, where the system determines that revolved model 702B best matches the set of distance values, the system may determine that the angular offset between image sensor 720 and laser distancer 710 is equivalent to the angular offset between three-dimensional model 702A and revolved model 702B. After determining the angular offset, the system may compensate for the angular offset when fusing image sequences with sets of distance measurements to generate three-dimensional reconstructions of environments.

Figure 8:
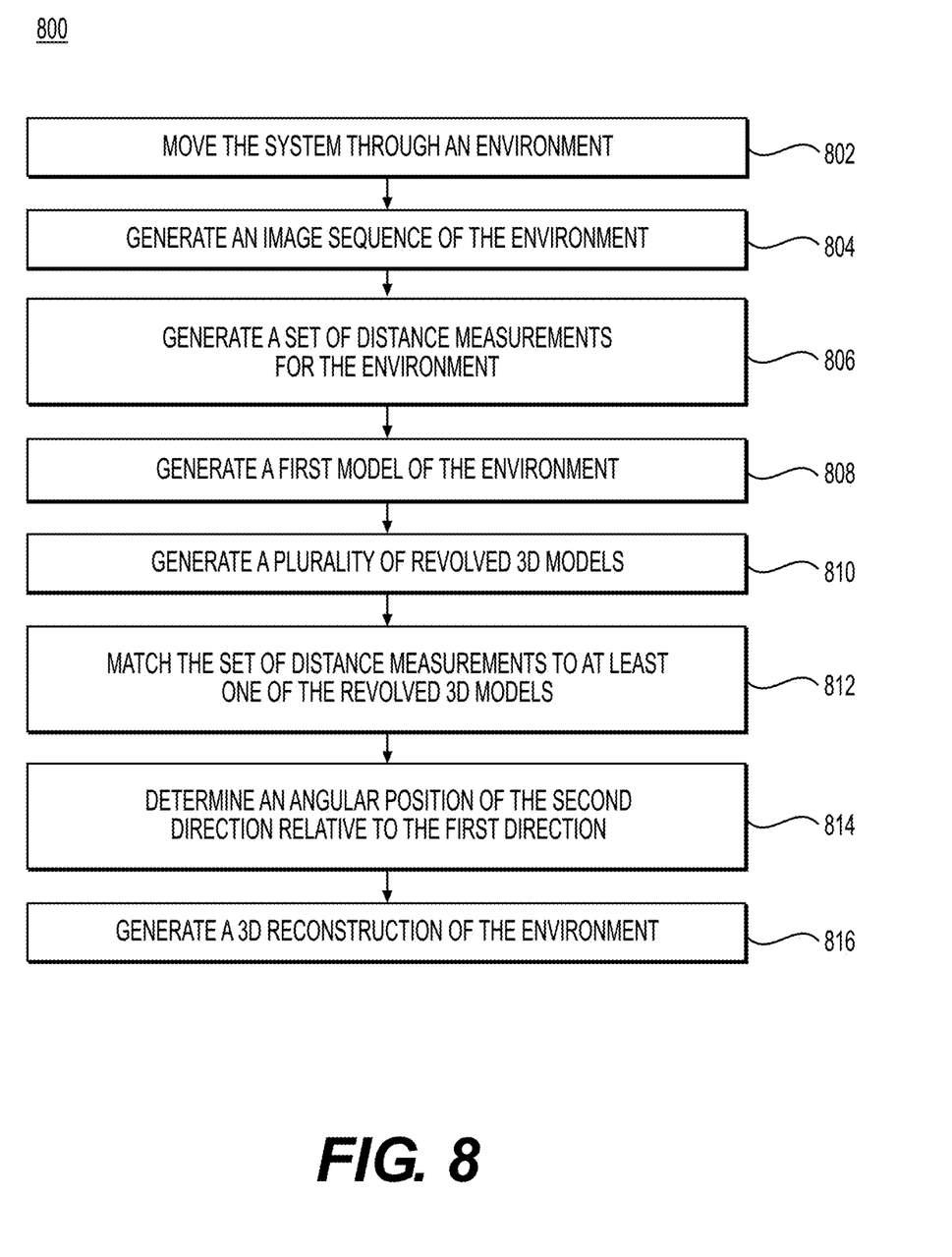
FIG. 8 depicts an exemplary method of generating a three-dimensional reconstruction of an environment, according to one or more embodiments.

An exemplary method of generating a three-dimensional reconstruction of an environment using the aforementioned calibration is depicted in FIG. 8. At step 802, a system may be moved, or translated, through an environment. The system may be a system such as system 100 and/or system 200 as described herein previously. The system may be incorporated in a vehicle, such as a UAV, drone, or car, which travels through the environment. The system may include an image sensor and a laser distancer. The image sensor may be directed in a first direction and the laser distancer may be directed in a second direction.

At step 804, an image sequence of the environment may be generated. The image sequence may be generated using the image sensor. For example, as the system is translated through the environment, the image sensor may periodically generate an image. In some embodiments, the image sensor may be configured to generate images at a fixed time interval. In some embodiments, the image sensor may be configured to generate images upon traveling, by the system, of a fixed distance. Each image of the image sequence of the environment may therefore be generated by the image sensor when the image sensor is in a slightly different position with respect to the environment.

At step 806, a set of distance measurements (or distance values) for the environment may be generated by the laser distancer. For example, as the system is translated through the environment, the laser distancer may periodically generate a distance measurement. In some embodiments, the laser distancer may be configured to generate distance measurements at a fixed time interval. In some embodiments, the image sensor may be configured to generate distance measurements upon traveling, by the system, of a fixed distance. In some embodiments, the laser distancer may be configured to generate a distance measurement concurrently with each image generated by the image sensor. Each distance measurement of the environment may therefore be generated by the laser distancer when the laser distancer is in a slightly different position with respect to the environment.

At step 808, the system may generate a first three-dimensional model of the environment. In some embodiments, the three-dimensional model may be a three-dimensional point cloud, for example. The system may generate the first three-dimensional model based on the image sequence alone, i.e. without the set of distance measurements. The first three-dimensional model may therefore lack scale. In some embodiments, the system may generate the first three-dimensional using a machine learning model. In some embodiments, the machine learning model may be a convolutional neural network. In some embodiments, the system may use known techniques to generate the three-dimensional model from the image sequence, such as triangulation or any other suitable technique.

At step 810, the system may generate a plurality of revolved three-dimensional models. The system may generate the plurality of revolved three-dimensional models by revolving the first three-dimensional model to a plurality of positions with respect to the image sensor. In some embodiments, the system may revolve the first three-dimensional model through a predetermined angular range. The predetermined angular range may be derived from known manufacturing tolerances for components of the system and/or known variances in the assembly process. In some embodiments, the system may revolve the first three-dimensional model about the image sensor incrementally in two dimensions. For example, taking angles $\alpha$ and $\beta$ (as described herein previously with reference to FIG. 7), the system may generate the plurality of revolved models according to the series $(i*\alpha/N, i*\beta/N)$ for $i=0, 1 \ldots N$.

At step 812, the system may match the set of distance measurements to at least one of the revolved three-dimensional models. The system may match the set of distance measurements by determining to which revolved three-dimensional model the set of distance measurements best fits. In some embodiments, the system may use an optimization algorithm to perform the matching. However, any suitable technique for matching the set of distance measurements to at least one of the revolved models may be used.

At step 814, the system may determine an angular position of the second direction relative to the first direction. In other words, the system may determine the angular offset between the first direction and the second direction. In some embodiments, the system may determine the angular position by calculating the angular position of the matched revolved three-dimensional model relative to the first three-dimensional model. In some embodiments, the angular position of the matched revolved three-dimensional model relative to the first three-dimensional model may be used as a proxy for the angular position of the second direction relative to the first direction.

In some embodiments, after determining the angular position, the system may repeat steps 810, 812, and/or 814 one or more times as part of a narrow band calibration process. For example, with the angular position of the second direction relative to the first direction known from performing steps 810, 812, and 814 a first time, the system may then generate another set of revolved three-dimensional models within a narrower angular range near the determined angular position. The system may then match at least one of the revolved models to the set of distance measurements to determine the angular position with greater accuracy. These narrow band calibration steps may be repeated as many times as desired to determine the angular position of the second direction relative to the first direction with desired accuracy.

At step 816, once the system has determined the angular position of the second direction relative to the first direction with desired accuracy, the system may generate a three-dimensional reconstruction of the environment by fusing the first three-dimensional model with the set of distance measurements and compensating for the angular position during fusion. The three-dimensional reconstruction may therefore effectively account for imperfections in the manufacturing and/or assembly of the system when generating the three-dimensional reconstruction with useful scale information.

It is to be understood that method 800 need not necessarily be performed in the exact order described herein and that the steps described herein may be rearranged in some embodiments. Further, in some embodiments, fewer than all steps of method 800 may be performed and in some embodiments additional steps may be performed.

Method 800 may therefore allow for effective calibration of a system for generating a three-dimensional reconstruction of an environment. In some embodiments, the calibration may be automatic, thereby relieving a user of manually calibrating the system to compensate for manufacturing and/or assembly irregularities. The method may therefore allow for easy and hassle-free generation of an accurate three-dimensional reconstruction of an environment including useful information about scale. Moreover, the method 800 may allow a system to generate accurate three-dimensional reconstructions without the need for expensive and/or complex components, thereby reducing the cost of such a system.

Figure 9:
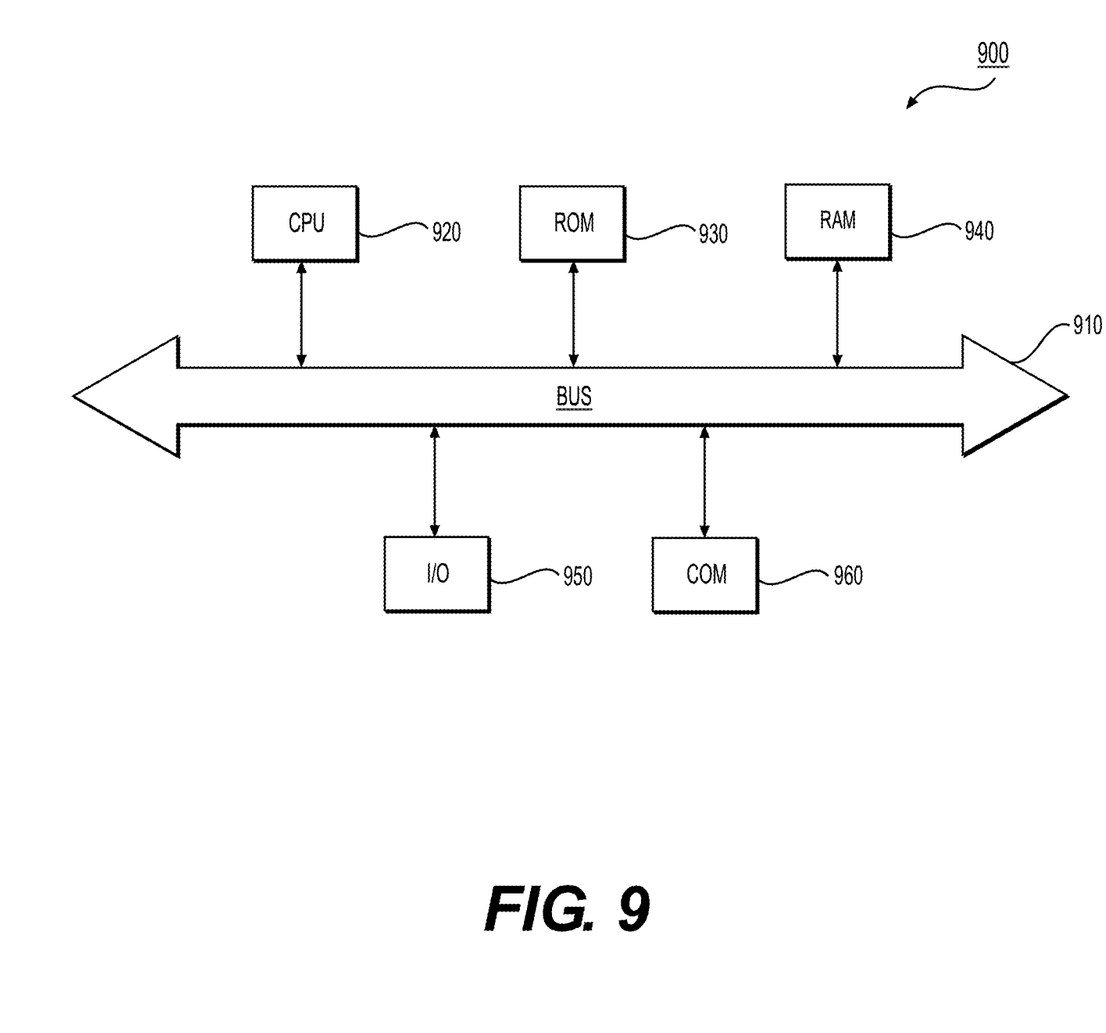
FIG. 9 depicts an example system that may execute techniques presented herein.

FIG. 9 depicts an example computer system that may be used with and/or execute the techniques described herein. FIG. 9 is a simplified functional block diagram of a computer that may be configured to execute techniques described herein, according to exemplary embodiments of the present disclosure. Specifically, the computer (or "platform" as it may not be a single physical computer infrastructure) may include a data communication interface 960 for packet data communication. The platform may also include a central processing unit ("CPU") 920, in the form of one or more processors, for executing program instructions. The platform may include an internal communication bus 910, and the platform may also include a program storage and/or a data storage for various data files to be processed and/or communicated by the platform such as ROM 930 and RAM 940, although the system 900 may receive programming and data via network communications. The system 900 also may include input and output ports 950 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems and/or methods may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: internet appliances, hand-held devices (including personal digital assistants ("PDAs")), wearable computers, all manner of cellular or mobile phones (including Voice over IP ("VoIP") phones), media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the internet or various other telecommunication networks. Such communications, for example, may enable loading of the software from one computer or processor into another, for example, from a management server or host computer of a mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, "one or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first selection could be termed a second selection, and, similarly, a second selection could be termed a first selection, without departing from the scope of the various described embodiments. The first selection and the second selection are both selections, but they are not the same selection.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

In this disclosure, relative terms, such as, for example, "about," "substantially," "generally," and "approximately" are used to indicate a possible variation of ±10% in a stated value.

The term "exemplary" is used in the sense of "example" rather than "ideal."

Other embodiments of the disclosure will be apparent to those skilled in the art from consideration of the specification and practice of the embodiments disclosed herein. It is intended that the specification and examples be considered as exemplary only, with a true scope and spirit of the present disclosure being indicated by the following claims.

What is claimed is:

1. A system comprising:
   a housing including an image sensor directed in a first direction and a distance sensor directed in a second direction, wherein during movement of the housing through an environment the image sensor is configured to generate an image sequence and the distance sensor is configured to generate a set of distance values, wherein the second direction is within a predetermined angular range of the first direction;
   a control unit including a processor and a memory storing instructions, wherein the processor is configured to execute the instructions to:
   generate, based on the image sequence, a first 3D model of the environment;
   generate a first set of revolved 3D models by revolving the first 3D model relative to the image sensor to a first plurality of positions within the predetermined angular range;
   match the set of distance values to at least one of the first set of revolved 3D models;
   determine, based on the matched at least one of the first set of revolved 3D models, a first angular position of the second direction relative to the first direction; and
   generate, based on the first 3D model, the set of distance values, and the first angular position, a 3D reconstruction of the environment, the 3D reconstruction including information indicative of a scale of the environment.

2. The system of claim 1, wherein the image sensor is incorporated within a monocular camera and the distance sensor is a single beam laser distancer including a laser emitter and a laser receiver.

3. The system of claim 1, wherein the memory further stores a machine learning model trained to learn associations between at least (i) a training set of image sequences and (ii) a training set of 3D models, each image sequences of the training set of image sequences corresponding to one or more 3D model of the training set of 3D models; and
   the processor is configured to generate the first 3D model of the environment using the machine learning model.

4. The system of claim 3, wherein the machine learning model is a convolutional neural network.

5. The system of claim 1, wherein the revolved 3D models are generated by incrementally revolving the 3D model relative to the image sensor to a predetermined number of positions extending substantially through the predetermined angular range.

6. The system of claim 1, wherein the revolved 3D models are generated by:
   incrementally revolving the first 3D model relative to the image sensor about a first axis to a first predetermined number of positions; and
   incrementally revolving the first 3D model relative to the image sensor about a second axis to a second predetermined number of positions;
   wherein the first axis is orthogonal to the second axis.

7. The system of claim 6, wherein the first 3D model and the revolved 3D models are 3D point clouds.

8. The system of claim 1, wherein the processor is further configured to execute the instructions to determine the angular position by:
   generating a second set of revolved 3D models by revolving the matched at least one of the first set of revolved 3D models relative to the image sensor to a second plurality of positions, the second plurality of positions existing in a fine angular range within the predetermined angular range; and
   matching the set of distance values to at least one of the second set of revolved 3D models.

9. The system of claim 1, wherein the processor is further configured to execute the instructions generate the 3D reconstruction in part by fusing the first 3D model and the set of distance values.

10. The system of claim 9, wherein the processor is further configured to execute the instructions to compensate for the angular position during generation of the 3D reconstruction.

11. A method comprising:
moving a housing through an environment, the housing including an image sensor directed in a first direction and a distance sensor directed in a second direction, wherein the second direction is within a predetermined angular range of the first direction;
during movement of the housing through the environment, generating an image sequence using the image sensor and generating a set of distance values using the distance sensor;
generating, using a processor and based on the image sequence, a first 3D model of the environment;
generating, using the processor based on the first 3D model and the predetermined angular range, a plurality of revolved 3D models by revolving the first 3D model relative to the image sensor to a plurality of positions within the predetermined angular range;
matching, using the processor, the set of distance values to at least one of the revolved 3D models;
determining, using the processor and based on the matched at least one of the revolved 3D models, an angular position of the second direction relative to the first direction; and
generating, using the processor and based on the first 3D model, the set of distance values, and the angular position, a 3D reconstruction of the environment, the 3D reconstruction including information indicative of a scale of the environment.

12. The method of claim 11, wherein the image sensor is incorporated within a monocular camera and the distance sensor is a single beam laser distancer including a laser emitter and a laser receiver.

13. The method of claim 11, wherein the processor is operatively connected to a memory storing instructions and a machine learning model trained to learn associations between at least (i) a training set of image sequences and (ii) a training set of 3D models, each image sequence of the training set of image sequences corresponding to one or more 3D model of the training set of 3D models; and
generating the first 3D model of the environment is performed by the processor using the machine learning model.

14. The method of claim 11, wherein generating the revolved 3D models further comprises incrementally revolving the 3D model relative to the image sensor to a predetermined number of positions extending substantially through the predetermined angular range.

15. The method of claim 11, wherein generating the revolved 3D models further comprises:
incrementally revolving the first 3D model relative to the image sensor about a first axis to a first predetermined number of positions; and
incrementally revolving the first 3D model relative to the image sensor about a second axis to a second predetermined number of positions;
wherein the first axis is orthogonal to the second axis.

16. The method of claim 15, wherein the first 3D model and the revolved 3D models are 3D point clouds.

17. The method of claim 11, wherein determining the angular position comprises:
generating, using the processor, a second set of revolved 3D models by revolving the matched at least one of the first set of revolved 3D models relative to the image sensor to a second plurality of positions, the second plurality of positions existing in a fine angular range within the predetermined angular range; and
matching, using the processor, the set of distance values to at least one of the second set of revolved 3D models.

18. The method of claim 11, wherein generating the 3D reconstruction comprises:
fusing the first 3D model and the set of distance values.

19. The method of claim 18, wherein generating the 3D reconstruction further comprises:
compensating for the angular position during generation of the 3D reconstruction.

20. A non-transitory computer readable medium storing instructions that, when executed by a processor, perform a method comprising:
during movement of a housing through a environment, generating an image sequence using an image sensor, wherein the image sensor is mounted relative to the housing and directed in a first direction;
during movement of the housing through the environment, generating a set of distance values using a distance sensor, wherein the distance sensor is mounted relative to the housing and directed in a second direction, wherein the second direction is within a predetermined angular range of the first direction;
generating, based on the image sequence, a first 3D model of the environment;
generating, based on the first 3D model and the predetermined angular range, a plurality of revolved 3D models by revolving the first 3D model relative to the image sensor to a plurality of positions within the predetermined angular range;
matching the set of distance values to at least one of the revolved 3D models;
determining, based on the matched at least one of the revolved 3D models, an angular position of the second direction relative to the first direction; and
generating, based on the first 3D model, the set of distance values, and the angular position, a 3D reconstruction of the environment, the 3D reconstruction including information indicative of a scale of the environment.

\* \* \* \* \*